(12) United States Patent
Webert et al.

(10) Patent No.: US 9,587,684 B2
(45) Date of Patent: Mar. 7, 2017

(54) COMPENSATION FOR A DRAG FORCE GENERATED BY A ROTATING CLUTCH PISTON SEAL

(71) Applicant: GM GLOBAL TECHNOLOGY OPERATIONS LLC, Detroit, MI (US)

(72) Inventors: David C. Webert, Livonia, MI (US); Scott D. Biggs, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 199 days.

(21) Appl. No.: 14/623,821

(22) Filed: Feb. 17, 2015

(65) Prior Publication Data

US 2016/0238086 A1 Aug. 18, 2016

(51) Int. Cl.
*F16D 48/02* (2006.01)
*F16D 48/00* (2006.01)

(52) U.S. Cl.
CPC .................... *F16D 48/00* (2013.01)

(58) Field of Classification Search
None
See application file for complete search history.

(56) References Cited

U.S. PATENT DOCUMENTS

| | | | | |
|---|---|---|---|---|
| 2013/0192948 A1* | 8/2013 | Rothvoss | ............ | F15B 15/1447 192/85.19 |
| 2013/0298757 A1* | 11/2013 | Kramer | ................... | F16D 48/02 91/471 |
| 2014/0371998 A1* | 12/2014 | Moorman | ............. | B60W 10/10 701/53 |

* cited by examiner

*Primary Examiner* — Edwin A Young
(74) *Attorney, Agent, or Firm* — Quinn Law Group, PLLC

(57) ABSTRACT

A method of regulating a clutch assembly that has a set of clutch plates and a clutch piston with a fluid seal in an automatic transmission that includes a hydraulic circuit is disclosed. The method includes commanding the hydraulic circuit via the controller to apply a first hydraulic force to the clutch piston to displace the clutch piston relative to the set of clutch plates in order to affect a shift between speed-ratios in the transmission. The method also includes determining a drag force of the fluid seal. The method also includes determining a velocity of the displaced clutch piston that results from the drag force of the fluid seal acting counter to the displacement of the clutch piston. The method additionally includes regulating the clutch assembly to compensate for the determined drag force of the fluid seal acting counter to the displacement of the clutch piston.

20 Claims, 3 Drawing Sheets

COMPENSATION FOR A DRAG FORCE GENERATED BY A ROTATING CLUTCH PISTON SEAL

TECHNICAL FIELD

The disclosure relates to compensation for a drag friction force generated by a seal of a rotating clutch piston in a transmission for a motor vehicle.

BACKGROUND

Modern motorized vehicles frequently include a powertrain that has an engine and an automatic transmission. Most automatic transmissions include a number of gear elements, generally in the nature of one or more planetary gear sets, for coupling the transmission's input and output shafts. Traditionally, automatic transmissions also include a number of hydraulically actuated torque transmitting devices, such as clutches and brakes, configured to selectively activate the aforementioned gear elements for establishing desired forward and reverse speed-ratios between the transmission's input and output shafts. A typical automatic transmission also includes a hydraulic circuit with a pump and solenoid valves to control the application of fluid pressure to each of the torque transmitting devices. The amount of torque transmitted through a typical automatic transmission is therefore dependent on the torque capacity of its torque transmitting devices, which is in turn proportional to fluid line pressure developed in the hydraulic circuit.

A transmission speed-ratio is generally defined as the transmission input speed divided by the transmission output speed. The transmission input shaft is generally selectively connectable to the vehicle engine, e.g., through a fluid coupling device such as a torque converter, whereas the output shaft is connected through a "drive train" directly to the vehicle wheels. Shifting from one speed-ratio to another is performed in response to engine throttle and vehicle speed, and generally involves releasing one or more "off-going" clutches associated with the current or attained speed-ratio, and applying one or more "on-coming" clutches associated with the desired or commanded speed-ratio.

To perform an "upshift", the transmission transitions from a high speed-ratio to a low speed-ratio, while, conversely, to perform a "downshift", the transmission transitions from a low speed-ratio to a high speed-ratio. An upshift or a downshift may be accomplished by disengaging a clutch associated with the current speed-ratio and contemporaneously engaging a clutch associated with the desired speed-ratio, thereby reconfiguring the gear set to operate at the desired speed-ratio. In order to achieve high quality shifting, shifts performed in the above manner require precise coordination between achieving desired torque capacity in the on-coming clutch, the engagement of the on-coming clutch, and disengagement of the off-going clutch.

SUMMARY

A method of regulating a clutch assembly that has at least one clutch plate and a clutch piston with a fluid seal in an automatic transmission that includes a hydraulic circuit is disclosed. The method includes commanding the hydraulic circuit via a controller to vary fluid line pressure and thereby apply a first hydraulic force to the clutch piston. The application of the first hydraulic force displaces the clutch piston relative to the set of clutch plates in order to affect a shift between speed-ratios in the transmission. The method also includes determining via the controller a drag force of the fluid seal. The method additionally includes determining via the controller a velocity of the displaced clutch piston relative to the set of clutch plates that results from the magnitude of the first hydraulic force being reduced by a predetermined drag force of the fluid seal. Furthermore, the method includes regulating the clutch assembly to compensate for the determined drag force of the fluid seal acting counter to the displacement of the clutch piston.

The transmission may include a transmission housing and the clutch assembly may be configured to rotate relative to the transmission housing. The clutch piston may include a clutch apply side configured to receive the first hydraulic force. The clutch piston may also include an opposing centrifugal compensation dam side configured to receive a controlled amount of pressurized fluid to generate a second hydraulic force that acts opposite to the first hydraulic force, such that the first and second hydraulic forces rise in response to an increase in rotational speed of the clutch assembly. The clutch assembly may include a return spring arranged on the centrifugal compensation dam side and configured to generate a spring force that acts on the clutch piston opposite to the first hydraulic force. The act of regulating the operation of the clutch assembly to compensate for the determined drag force of the fluid seal acting counter to the displacement of the clutch piston may include increasing the velocity of the clutch piston via one of varying the first hydraulic force and varying the second hydraulic force.

The clutch assembly may include a first fluid passage configured to feed pressurized fluid from the hydraulic circuit to the clutch apply side for applying the first hydraulic force. Additionally, the clutch assembly may include a second fluid passage configured to feed pressurized fluid from the hydraulic circuit to the centrifugal compensation dam side for applying the second hydraulic force.

The clutch assembly may include a bleed orifice arranged on the centrifugal compensation dam side. In such a case, the method may further include limiting pressure build-up on the centrifugal compensation dam side via the bleed orifice.

The act of commanding the hydraulic circuit to apply the first hydraulic force to the clutch piston may urge the clutch piston to engage the set of clutch plates when the first hydraulic force is smaller than a sum of the spring force and the determined drag force of the fluid seal. In such a case, the act of regulating the clutch assembly to compensate for the determined drag force of the fluid seal acting counter to the displacement of the clutch piston may include commanding the hydraulic circuit to increase the line pressure for increasing the first hydraulic force.

On the other hand, the act of commanding the hydraulic circuit to apply the first hydraulic force to the clutch piston may urge the clutch piston away from and disengage the set of clutch plates when the first hydraulic force is smaller than a sum of the spring force and the determined drag force of the fluid seal. In the above case, the act of regulating the clutch assembly to compensate for the determined drag force of the fluid seal acting counter to the displacement of the clutch piston may include commanding the hydraulic circuit to reduce the line pressure for reducing the first hydraulic force.

The act of regulating the clutch assembly to compensate for the determined drag force of the fluid seal acting counter to the displacement of the clutch piston may include commanding the transmission to perform an upshift from one transmission speed-ratio to another speed-ratio to limit the rotational speed of the clutch assembly.

The transmission may be operatively connected to an internal combustion engine in a powertrain of a motor vehicle. In such a case, the act of regulating the clutch assembly to compensate for the determined drag force of the fluid seal acting counter to the displacement of the clutch piston may include limiting rotational speed of the engine. Such an operation may be performed while the transmission is in one of neutral, park, and reverse modes.

A system for regulating operation of the above clutch assembly in an automatic transmission is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
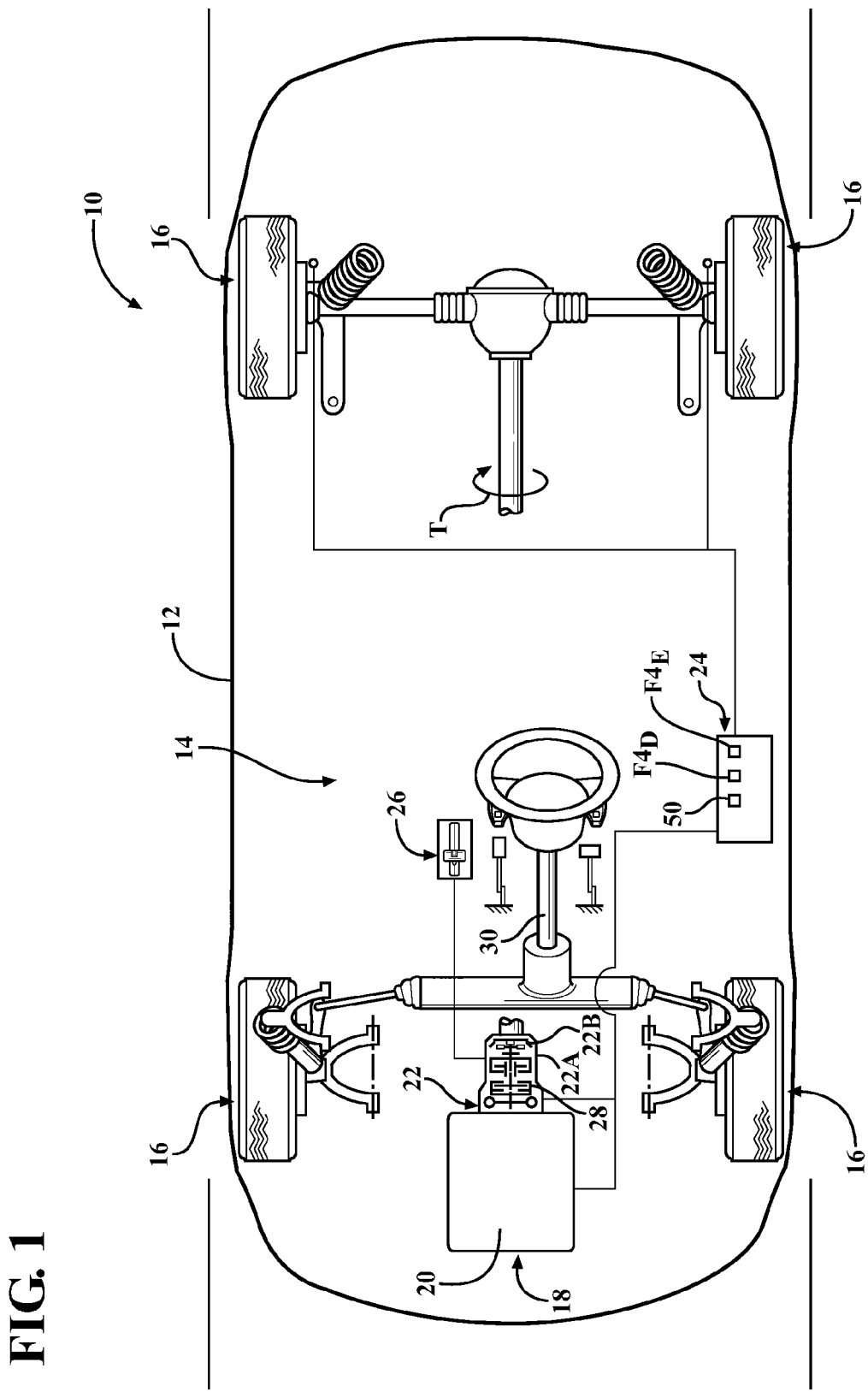
FIG. 1 is a schematic illustration of a vehicle employing a powertrain that includes an internal combustion engine connected to an automatic transmission having a selectively engageable clutch assembly for establishing transmission speed-ratios.

Referring to the drawings, wherein like reference numbers refer to like components, FIG. 1 illustrates a vehicle 10 that includes a vehicle body 12 that defines a vehicle interior or passenger compartment 14. The vehicle 10 also includes a plurality of road wheels 16 and a powertrain 18 configured to launch and propel a vehicle, i.e., operate the vehicle in all speed-ratio ranges between low and high road speeds.

The powertrain 18 includes an internal combustion engine 20 for generating engine torque T and may also include a variety of additional power sources, such as one or more electric motor/generators (not shown). The powertrain 18 also includes a multiple speed-ratio automatically-shiftable, a.k.a., automatic, transmission 22 operatively connecting the engine 20 to at least some of the wheels 16 for transmitting engine torque T thereto. The vehicle 10 also includes an electronic control unit (ECU) or controller 24. The controller 24 is operatively connected to the powertrain 18 in order to control and coordinate operation of the engine 20 and the transmission 22. Each of the engine 20 and transmission 22 may also be separately controlled by a respective engine controller and a transmission control unit, which would also be programmed to communicate with each other to affect overall control of the powertrain 18. However, for simplicity, the present disclosure will be limited to describing control of the powertrain 18 via the controller 24.

The controller 24 includes a memory that is tangible and non-transitory. The memory may be any recordable medium that participates in providing computer-readable data or process instructions. Such a medium may take many forms, including but not limited to non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to a processor of a computer. Memory of the controller 24 may also include a floppy disk, a flexible disk, hard disk, magnetic tape, any other magnetic medium, a CD-ROM, DVD, any other optical medium, etc. The controller 24 can be configured or equipped with other required computer hardware, such as a high-speed clock, requisite Analog-to-Digital (A/D) and/or Digital-to-Analog (D/A) circuitry, any necessary input/output circuitry and devices (I/O), as well as appropriate signal conditioning and/or buffer circuitry. Any algorithms required by the controller 24 or accessible thereby may be stored in the memory and automatically executed to provide the required functionality.

Arranged inside the passenger compartment 14 is a transmission shift selector 26 for controlling operation of the transmission 22. As known by those skilled in the art, the transmission shift selector 26, which may be a mechanical control lever or electro-mechanical switch, is configured, i.e., designed and constructed, to be manipulated by an operator of the vehicle 10 for selecting among operating modes, speed-ratio ranges, and/or specific speed-ratios of the transmission 22. Specific operating modes or ranges of the transmission 22 may include a forward or drive mode in which engine torque can be employed to move the vehicle 10 in one direction, a reverse mode in which engine torque can be employed to move the vehicle in a direction that is opposite to that of the drive mode, and a neutral mode in which no engine torque can be transmitted to the wheel(s) 16. The transmission 22 also includes a park mode in which the transmission blocks vehicle movement. The controller 24 is programmed to determine in real time the mode in which the transmission 22 is operating currently and control various functions of the transmission and the engine 20 accordingly.

Typically, automatic transmissions, such as the transmission 22, include a gear-train that has input and output members or shafts and a number of gear elements, generally in the nature of one or more planetary gear sets, for coupling the input and output shafts. Traditionally, the transmission 22 also includes a related number of hydraulically actuated torque transmitting devices, such as a representative clutch assembly 28 (shown in FIGS. 2 and 3) that will be described in detail below. Such hydraulically actuated torque transmitting devices are selectively engageable to activate the aforementioned gear elements for establishing desired forward and reverse speed-ratios between the transmission's input and output shafts. A speed-ratio is generally defined as the transmission input speed divided by the transmission output speed. The transmission input shaft is generally selectively connectable to the vehicle engine (e.g., through a fluid coupling device such as a torque converter), whereas the output shaft is connected through a "drive train" directly to the vehicle wheels.

Shifting from one speed-ratio to another is typically performed in response to engine throttle and vehicle speed, and generally involves releasing one or more "off-going" clutches associated with the current or attained speed-ratio, and applying one or more "on-coming" clutches associated with the desired or commanded speed-ratio. Each of the off-going and on-coming clutches may be configured like the representative clutch assembly 28. To perform a "downshift", the transmission transitions from a low speed-ratio to a high speed-ratio. The downshift is accomplished by disengaging a clutch associated with the lower speed-ratio, and contemporaneously engaging a clutch associated with the higher speed-ratio, thereby reconfiguring the gear set to operate at the higher speed-ratio. The selection of speed-ratios in the transmission 22 permits effective use of engine torque and extends operation of the engine 20 over a wide range of vehicle speeds. Typically, the controller 24 uses signals from various sensors (not shown) connected to the engine 20, the transmission 22, and other vehicle systems, to determine when and how to shift between speed-ratios in the transmission.

Figure 2:
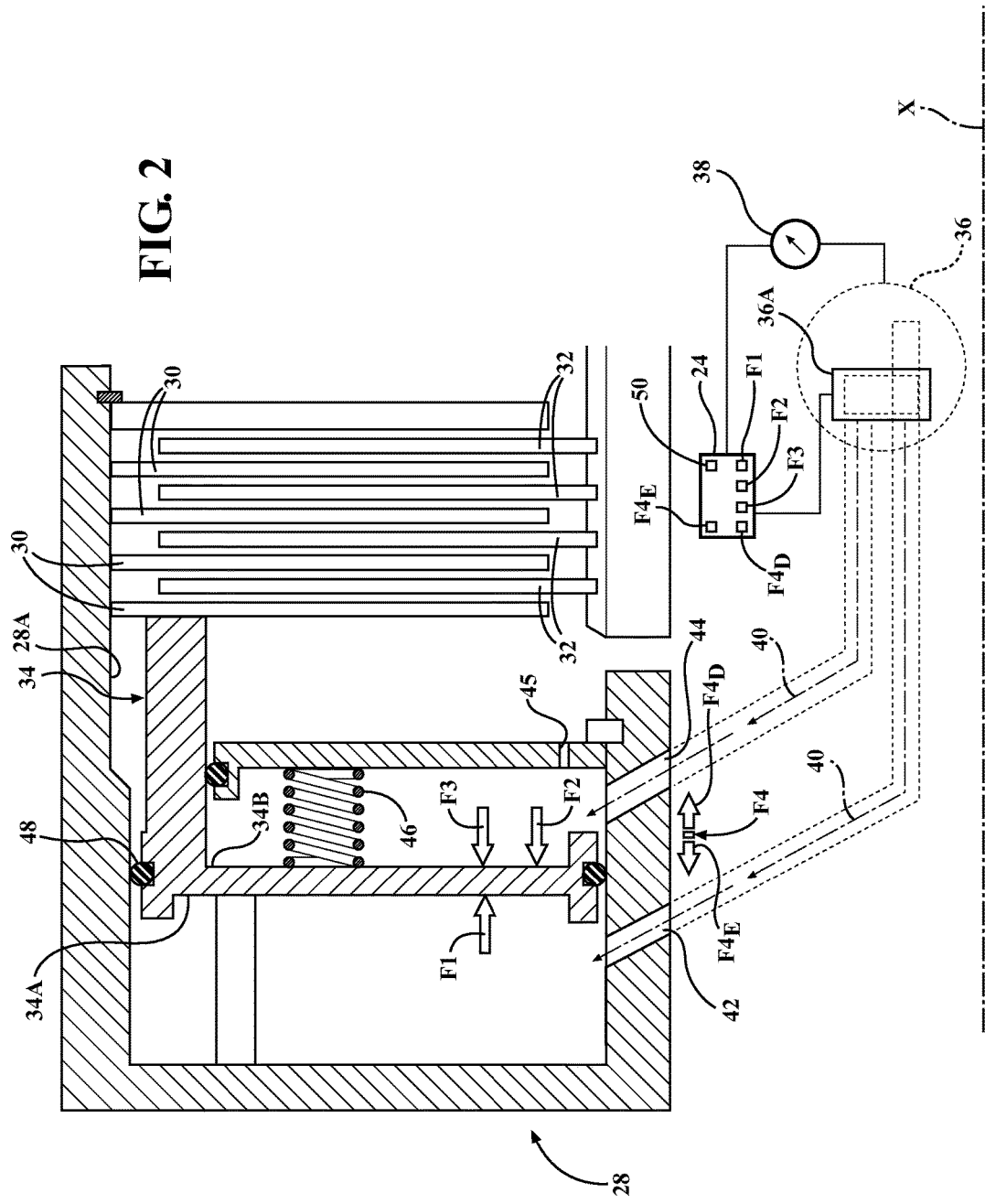
FIG. 2 is a schematic illustration of a cross-section of the clutch assembly shown in FIG. 1, the clutch assembly depicted in a disengaged state.
Figure 3:
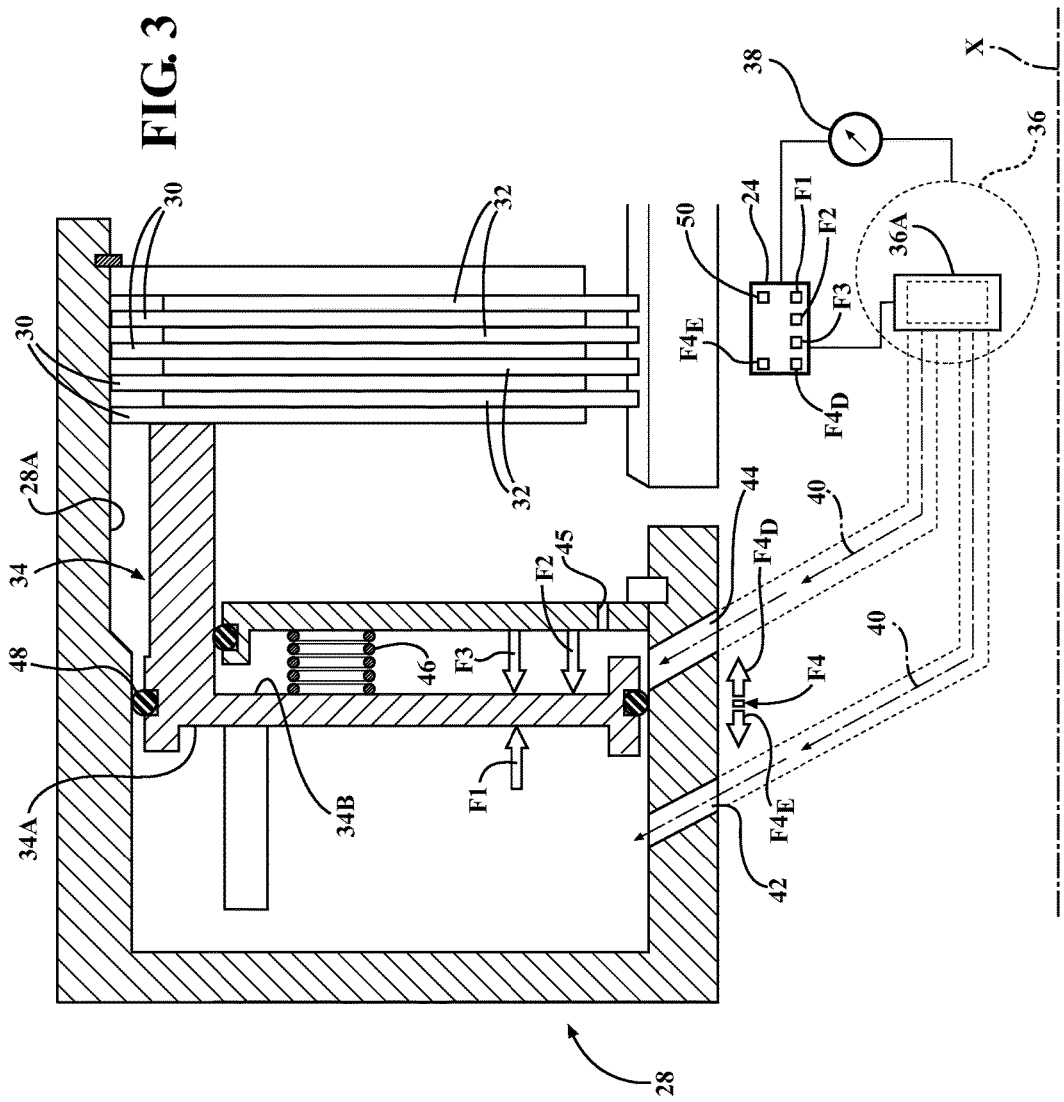
FIG. 3 is a schematic illustration of the clutch assembly shown in FIG. 2, except that the clutch assembly is depicted in an engaged state.

As shown in FIG. 1, the transmission 22 includes a transmission housing or case 22A that is configured to house internal components of the transmission, such as a gear-train 22B and at least one torque transmitting device, such as the clutch assembly 28. As shown in FIGS. 2 and 3, the clutch assembly 28 includes a set of interspaced clutch plates, in particular friction plates 30 and reaction plates 32, configured to be engaged by an application of force from a clutch piston 34. FIG. 2 shows the clutch assembly 28 in an engaged state, while FIG. 3 shows the clutch assembly in a disengaged state. The clutch assembly 28 includes a clutch case 28A that houses the clutch piston 34, and the interspaced friction plates 30 and reaction plates 32. The friction plates 30 may be rotationally fixed, e.g., splined, to a first part of the gear-train 22B of the transmission 22 and the reaction plates 32 may be rotationally fixed to a second part of the gear-train. As indicated above, each of such first and second parts of the gear-train 22B may be an input shaft, an output shaft, or one of the planetary gear sets, each configured to rotate relative to an axis X. Although specific first and second parts of the gear-train 22B are not indicated, the respective first and second parts of the gear-train may be any non-stationary, i.e., rotating, gear-train elements of the transmission 22. Accordingly, the clutch assembly 28 is configured to rotate with the gear train 22B relative to the case 22A, while the engagement of the interspaced friction plates 30 and reaction plates 32 via the clutch piston 34 rotationally couples the respective first and second parts of the gear-train.

A hydraulic circuit 36 is arranged inside the transmission 22. The hydraulic circuit 36 includes a hydraulic pump 38 configured to supply a pressurized fluid 40 at a specific fluid line pressure to the clutch assembly 28, thus generating a hydraulic force for actuating the clutch piston 34. Typically, the hydraulic circuit 36 also includes a plurality of solenoids, control valves, and fluid passages that are indicated schematically at 36A, and, although not individually shown, are known to those skilled in the art. The hydraulic circuit 36 is configured to control delivery of the pressurized fluid 40 to the torque transmitting devices, such as the clutch assembly 28. The controller 24 is in operative communication with the hydraulic circuit 36, and configured to command the hydraulic circuit to establish appropriate fluid line pressure to thereby apply a first hydraulic force F1 to the clutch piston 34. In turn, the first hydraulic force F1 displaces the clutch piston 34 relative to the friction plates 30 and reaction plates 32 to affect a shift between speed-ratios in the transmission 22. In general, increasing the fluid line pressure acts to reduce the amount of time required to build or generate the first hydraulic force F1, while, conversely, decreasing the line pressure acts to increase the amount of time required to generate the first hydraulic force.

The clutch piston 34 includes a clutch apply side 34A. The clutch apply side 34A is acted upon by the pressurized fluid 40 such that the first hydraulic force F1 urges the clutch piston 34 toward the friction plates 30 and reaction plates 32. The clutch assembly 28 also includes a first fluid passage 42 configured to feed the pressurized fluid 40 from the hydraulic circuit 36 to the clutch apply side 34A for applying the first hydraulic force F1. The clutch piston 34 also includes an opposing centrifugal compensation dam side 34B. The clutch assembly 28 also includes a second fluid passage 44 configured to feed the pressurized fluid 40 from the hydraulic circuit 36 to the centrifugal compensation dam side 34B. Additionally, the clutch assembly 28 includes a bleed orifice 45 arranged on the centrifugal compensation dam side 34B for limiting pressure build-up thereon. A controlled amount of the pressurized fluid 40 is directed to the centrifugal compensation dam side 34B for generating and varying a second hydraulic force F2 thereon via the passage 44 and with the aid of the bleed orifice 45. Overall, the second force F2 acts on the clutch piston 34 as a centrifugal compensation force in a direction that is opposite to the first hydraulic force F1.

As the clutch assembly 28 rotates relative to the case 22A (shown in FIG. 1), the fluid present on each of the clutch apply side 34A and the centrifugal compensation dam side 34B is subjected to a centrifugal force. As a result, the magnitudes of the first and second hydraulic forces F1, F2 rise in response to an increase in rotational speed of the clutch assembly 28. Consequently, as the rotational speed of the clutch assembly 28 increases, the controlled amount of the pressurized fluid 40 supplied to the centrifugal compensation dam side 34B generates a gradual increase or buildup in the second force F2 which compensates or counters the rise in the first hydraulic force F1.

The clutch assembly 28 also includes a return spring 46 arranged on the centrifugal compensation dam side 34B. The return spring 46 is configured to generate a spring force F3 that acts on the clutch piston 34 opposite to the first hydraulic force F1 and in the same direction as the force F2. When pressure of the fluid 40 is reduced via the hydraulic circuit 36, the spring force F3 urges the clutch piston 34 away from the clutch plates to thereby disengage the clutch assembly 28.

As shown, the clutch piston 34 additionally includes a fluid seal 48. The fluid seal 48 is configured to contain the pressurized fluid 40 on the respective clutch apply side 34A and centrifugal compensation dam side 34B and minimize transfer of the fluid between the two respective sides of the clutch piston 34. The fluid seal 48 may be configured from a suitable material, for example polymer compound, that is capable of withstanding compression set and wear during continuous operation in a transmission clutch piston environment. In order to provide appropriate sealing in the clutch assembly 28, the fluid seal 48 is compressed against the walls of a clutch case 28A. Such compression of the fluid seal 48 generates a predetermined drag force F4 at the walls of the clutch case 28A that resists displacement of the clutch piston 34. Accordingly, depending on the direction of displacement of the clutch piston 34, i.e., whether the friction plates 30 and reaction plates 32 are being engaged or disengaged, the drag force F4 may act either contrary to or in the same direction as the force F1.

The transmission 22 may be operated during a two-part experimental procedure to establish the value of the drag force F4 in both the clutch engagement and clutch disengagement directions. During a first part of the experimental procedure the controller 24 may be used to command the hydraulic circuit 36 to apply the first hydraulic force F1 to the clutch piston 34 such that the clutch piston is displaced relative to the set of clutch plates at a determinable velocity.

The velocity of the clutch piston 34 may be measured via a dedicated sensor or probe (not shown) specifically installed in the transmission 22 for the experimental procedure. The controller 24 may also be used to commence applying a sufficiently large first hydraulic force F1 to establish certainty that the clutch piston 34 is being displaced toward the set of clutch plates, i.e., to engage the clutch assembly 28. Furthermore, the controller 24 may be used to reduce the magnitude of the first hydraulic force F1 and thereby reduce the velocity of the clutch piston 34 until the velocity reaches zero. The magnitude of the first force F1 at which the velocity of the clutch piston 34 has been reduced to zero can be established and retained in the memory of the controller 24 as a drag force $F4_E$ of the fluid seal 48 in the clutch engagement direction.

A second part of the experimental procedure may then be run. Accordingly, the controller 24 may be used to reduce the hydraulic force F1 sufficiently to establish certainty that the clutch piston 34 is being displaced away from the set of clutch plates, i.e., to disengage the clutch assembly 28. The controller 24 may then be used to increase the magnitude of the first hydraulic force F1 and thereby reduce the velocity of the clutch piston 34 until the velocity again reaches zero. Therefore, in the second part of the experimental procedure the magnitude of the first force F1 at which the velocity of the clutch piston 34 has been reduced to zero can be established and retained in the memory of the controller 24 as a drag force $F4_D$ of the fluid seal 48 in the clutch disengagement direction.

The controller 24 can then be configured, i.e., programmed to regulate the clutch assembly 28 to compensate for the drag force F4 of the fluid seal 48 acting counter to displacement of the clutch piston 34 during operation of the transmission 22, such as by the drag force $F4_E$ during clutch engagement and by the drag force $F4_D$ during clutch disengagement. Accordingly, the controller 24 is configured to commence a shift between speed-ratios in the transmission 22 via actuation of the clutch assembly 28. Additionally, the controller 24 is configured to determine, i.e., calculate, velocity of the displaced clutch piston 34 relative to the clutch plates that results from the respective drag force $F4_E$ or $F4_D$ of the fluid seal 48 acting counter to the displacement of the clutch piston 34. The subject calculation of velocity of the displaced clutch piston 34 relative to the clutch plates can be determined via a mathematical relationship 50 programmed into the controller 24:

$$v_{PistnSpd} = \frac{Q}{A_C} \quad (50)$$

The mathematical relationship 50 defines velocity $v_{PistnSpd}$ of the displaced clutch piston 34 based on oil flow Q through the first fluid passage 42 into fluid volume on the clutch apply side 34A and an area $A_C$ of the clutch piston on the apply side.

A desired velocity of the clutch piston 34 that is necessary to complete a quality speed-ratio shift in the transmission 22 may be defined, i.e., predetermined, via appropriate design calculations, verified during testing, and programmed into the controller 24. A quality speed-ratio shift is typically defined as a shift that is accomplished with appropriate quickness and smoothness in response to a request from the operator of the vehicle 10 and depending on operating parameters of the engine 20 and the vehicle. The controller 24 also regulates the clutch assembly 28 to compensate for the predetermined drag force F4 acting counter to the displacement of the clutch piston 34 and reducing the velocity of the clutch piston 34 below the desired velocity of the clutch piston required for a quality speed-ratio shift. Such compensation for the predetermined drag force F4 may be accomplished by increasing the first hydraulic force F1. Compensation for the predetermined drag force F4 may also be accomplished by controlling the amount of pressurized fluid 40 supplied to the centrifugal compensation dam side 34B to thereby decrease the second hydraulic force F2 by a magnitude equal to the drag force $F4_E$. Either increasing the first hydraulic force F1 or decreasing the second hydraulic force F2, as described above, can re-establish the desired velocity of the clutch piston 34 when the clutch assembly 28 is being engaged. Additionally, such compensation for the predetermined drag force F4 may be accomplished by either decreasing the first hydraulic force F1 or increasing the second hydraulic force F2 via controlling the amount of supplied pressurized fluid 40 by a magnitude equal to the drag force $F4_D$ to re-establish the desired velocity of the clutch piston 34 when the clutch assembly 28 is being disengaged.

Accordingly, when the controller 24 commands the hydraulic circuit 36 to apply the first hydraulic force F1 to urge the clutch piston 34 to engage the friction plates 30 and reaction plates 32, the controller may vary the fluid line pressure to increase the first hydraulic force F1. Such an increase of the first hydraulic force F1 can compensate for the determined drag force $F4_E$ of the fluid seal 48 such that the force F1 overcomes the sum of the forces F3 and $F4_E$ by an appropriate value. As a result, the clutch piston 34 will move to engage the friction plates 30 and reaction plates 32 at a velocity necessary to achieve a quality speed-ratio shift. In a different instance, when the controller 24 commands the hydraulic circuit 36 to apply the first hydraulic force F1 to urge the clutch piston 34 to disengage the friction plates 30 and reaction plates 32, the controller may vary the fluid line pressure to reduce the first hydraulic force F1. Such a reduction of the first hydraulic force F1 can compensate for the determined drag force $F4_D$ of the fluid seal 48 such that the sum of the forces F3 and $F4_D$ overcome the force F1 by an appropriate value. As a result, the clutch piston 34 will move to disengage the friction plates 30 and reaction plates 32 at a velocity necessary that will achieve a quality speed-ratio shift.

The controller 24 may also be configured to regulate the operation of the clutch assembly 28 to compensate for the determined drag force F4 of the fluid seal 48 acting counter to the displacement of the clutch piston 34 by commanding the transmission 22 to perform an "early" upshift from one speed-ratio to another speed-ratio, i.e., at a reduced rotational speed of engine 20. Such an early upshift serves to limit or reduce the rotational speed of the clutch assembly 28 compared to an upshift at a higher engine speed and thereby reduces the effect of centrifugal force on the first hydraulic force F1. The controller 24 may also be configured to regulate the operation of the clutch assembly 28 to compensate for the determined drag force F4 of the fluid seal 48 acting counter to the displacement of the clutch piston 34 by limiting maximum rotational speed of the engine 20 in neutral, park, and, reverse ranges of the transmission 22. Such limiting of rotational speed of the engine 20 serves to reduce the rotational speed of the clutch assembly 28 to thereby reduce the effect of centrifugal force on the first hydraulic force F1.

Figure 4:
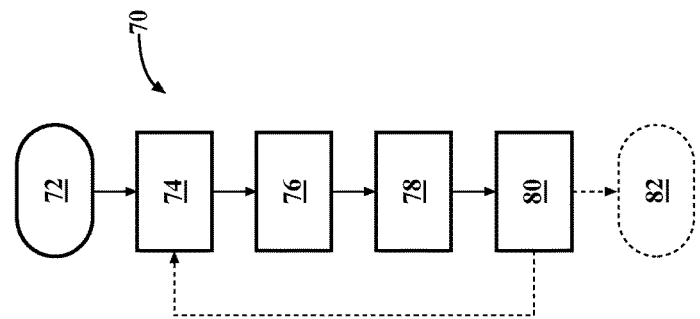
FIG. 4 is a flow diagram of a method of regulating the clutch assembly shown in FIGS. 2 and 3 in the automatic transmission shown in FIG. 1.

FIG. 4 depicts a method 70 of regulating the clutch assembly 28 in the automatic transmission 22, as described above with respect to FIGS. 1-3. The method 70 is initiated in frame 72 with the vehicle 10 being motivated by torque T of the engine 20. Following frame 72, the method 70 proceeds to frame 74, where the method includes commanding the hydraulic circuit 36 via the controller 24 to apply the first hydraulic force F1 to the clutch piston 34 to displace the clutch piston relative to the friction plates 30 and reaction plates 32. As described above with respect to FIGS. 1-3, such displacement of the clutch piston 34 is controlled to either engage or disengage the clutch assembly 28 to thereby affect a shift between speed-ratios in the transmission 22. After frame 74, the method advances to frame 76.

In frame 76 the method includes determining or retrieving via the controller 24 the drag force F4 of the fluid seal 48. Depending on whether the magnitude of the first hydraulic force F1 is intended to bring about engagement or disengagement of the clutch assembly 28, the specific drag force F4 retrieved by the controller 24 is the drag force $F4_E$ of the fluid seal 48 in the clutch engagement direction or the drag force $F4_D$ of the fluid seal 48 in the clutch disengagement direction. Following frame 76, the method proceeds to frame 78. In frame 78 the method 70 includes determining via the controller 24 the velocity of the displaced clutch piston 34 relative to the friction plates 30 and reaction plates 32 that results from the determined drag force $F4_E$ or $F4_D$ of the fluid seal 48 acting counter to the displacement of the clutch piston. After frame 78 the method advances to frame 80 for regulating the clutch assembly 28 to compensate for the determined drag force $F4_E$ or $F4_D$ of the fluid seal 48 acting counter to the displacement of the clutch piston 34.

As described above with respect to FIGS. 1-3, compensation for the determined drag force $F4_E$ or $F4_D$ of the fluid seal 48 acting counter to the displacement of the clutch piston 34 may be in the form of increasing the velocity of the clutch piston 34 via commanding the transmission 22 to perform an upshift from one transmission speed-ratio to another speed-ratio to limit the rotational speed of the clutch assembly 28. Also, compensation for the determined drag force $F4_E$ or $F4_D$ may include limiting rotational speed of the engine in neutral, park, and reverse ranges of the transmission 22. Compensation for the determined drag force $F4_E$ may include commanding the hydraulic circuit 36 to increase the first hydraulic force F1 or control the amount of pressurized fluid 40 supplied to the centrifugal compensation dam side 34B to thereby decrease the second hydraulic force F2 when the clutch assembly 28 is being engaged. On the other hand, compensation for the determined drag force $F4_D$ may include commanding the hydraulic circuit to either reduce the first hydraulic force F1 or control the amount of pressurized fluid 40 supplied to the centrifugal compensation dam side 34B to thereby increase the second hydraulic force F2 when the clutch assembly 28 is being disengaged. The method 70 may conclude in frame 82 once the shift between speed-ratios in the transmission 22 has been completed or return to frame 74 for initiating another speed-ratio shift using the clutch assembly 28 or another similarly configured clutch assembly.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A method of regulating a clutch assembly in an automatic transmission having a hydraulic circuit configured to vary a fluid line pressure, the clutch assembly having a set of clutch plates and a clutch piston with a fluid seal, the method comprising:
    commanding, via a controller, the hydraulic circuit to apply a first hydraulic force to the clutch piston to displace the clutch piston relative to the set of clutch plates and thereby affect a shift between speed-ratios in the transmission;
    determining, via the controller, a drag force of the fluid seal;
    determining, via the controller, a velocity of the displaced clutch piston relative to the set of clutch plates that results from the determined drag force of the fluid seal acting counter to the displacement of the clutch piston; and
    regulating the clutch assembly to compensate for the determined drag force of the fluid seal acting counter to the displacement of the clutch piston.

2. The method of claim 1, wherein:
    the transmission includes a transmission housing and the clutch assembly is configured to rotate relative to the transmission housing;
    the clutch piston includes a clutch apply side configured to receive the first hydraulic force and an opposing centrifugal compensation dam side configured to receive a second hydraulic force that acts opposite to the first hydraulic force, and wherein the first and second hydraulic forces rise in response to an increase in rotational speed of the clutch assembly;
    the clutch assembly includes a return spring arranged on the centrifugal compensation dam side and configured to generate a spring force that acts on the clutch piston opposite to the first hydraulic force; and
    said regulating the clutch assembly to compensate for the determined drag force of the fluid seal acting counter to the displacement of the clutch piston includes increasing the velocity of the clutch piston via one of varying the first hydraulic force and varying the second hydraulic force.

3. The method of claim 2, wherein the clutch assembly includes a first fluid passage configured to feed pressurized fluid from the hydraulic circuit to the clutch apply side for applying the first hydraulic force and a second fluid passage configured to feed pressurized fluid from the hydraulic circuit to the centrifugal compensation dam side for applying the second hydraulic force.

4. The method of claim 2, wherein the clutch assembly includes a bleed orifice arranged on the centrifugal compensation dam side, the method further comprising limiting pressure build-up on the centrifugal compensation dam side via the bleed orifice.

5. The method of claim 2, wherein said commanding the hydraulic circuit to apply the first hydraulic force to the clutch piston includes urging the clutch piston to engage the set of clutch plates when the first hydraulic force is greater than a sum of the spring force and the determined drag force of the fluid seal.

6. The method of claim 5, wherein said regulating the clutch assembly to compensate for the determined drag force of the fluid seal acting counter to the displacement of the clutch piston includes commanding the hydraulic circuit to increase the fluid line pressure for increasing the first hydraulic force.

7. The method of claim 2, wherein said commanding the hydraulic circuit to apply the first hydraulic force to the clutch piston includes urging the clutch piston away from and disengaging the set of clutch plates when the first hydraulic force is smaller than a sum of the spring force and the determined drag force of the fluid seal.

8. The method of claim 7, wherein said regulating the clutch assembly to compensate for the determined drag force of the fluid seal acting counter to the displacement of the clutch piston includes commanding the hydraulic circuit to reduce the fluid line pressure for reducing the first hydraulic force.

9. The method of claim 1, wherein said regulating the clutch assembly to compensate for the determined drag force of the fluid seal acting counter to the displacement of the clutch piston includes commanding the transmission to perform an upshift from one transmission speed-ratio to another speed-ratio to limit the rotational speed of the clutch assembly.

10. The method of claim 1, wherein:
the transmission is operatively connected to an internal combustion engine in a powertrain of a motor vehicle; and
said regulating the clutch assembly to compensate for the determined drag force of the fluid seal acting counter to the displacement of the clutch piston includes limiting rotational speed of the engine.

11. A system for regulating operation of a clutch assembly in an automatic transmission, the clutch assembly having a set of clutch plates and a clutch piston with a fluid seal, the system comprising:
a hydraulic circuit arranged inside the transmission and configured to vary a fluid line pressure to the clutch assembly; and
a controller having a memory, in operative communication with the hydraulic circuit, and configured to:
command the hydraulic circuit to apply a first hydraulic force to the clutch piston to displace the clutch piston relative to the set of clutch plates and thereby affect a shift between speed-ratios in the transmission;
determine a drag force of the fluid seal;
determine a velocity of the displaced clutch piston relative to the set of clutch plates that results from the determined drag force of the fluid seal acting counter to the displacement of the clutch piston; and
regulate the clutch assembly to compensate for the determined drag force of the fluid seal acting counter to the displacement of the clutch piston.

12. The system of claim 11, wherein:
the transmission includes a transmission housing and the clutch assembly is configured to rotate relative to the transmission housing;
the clutch piston includes a clutch apply side configured to receive the first hydraulic force and an opposing centrifugal compensation dam side configured to receive a second hydraulic force that acts opposite to the first hydraulic force, and wherein the first and second hydraulic forces rise in response to an increase in rotational speed of the clutch assembly;
the clutch assembly includes a return spring arranged on the centrifugal compensation dam side and configured to generate a spring force that acts on the clutch piston opposite to the first hydraulic force; and
the controller is configured to regulate the clutch assembly to compensate for the determined drag force of the fluid seal acting counter to the displacement of the clutch piston by increasing the velocity of the clutch piston via one of varying the first hydraulic force and varying the second hydraulic force.

13. The system of claim 12, wherein the clutch assembly includes a first fluid passage configured to feed fluid from the hydraulic circuit to the clutch apply side for applying the first hydraulic force and a second fluid passage configured to feed fluid from the hydraulic circuit to the centrifugal compensation dam side for applying the second hydraulic force.

14. The system of claim 12, wherein the clutch assembly includes a bleed orifice arranged on the centrifugal compensation dam side and configured to limit pressure build-up thereon.

15. The system of claim 12, wherein the controller is configured to command the hydraulic circuit to apply the first hydraulic force to the clutch piston to urge the clutch piston to engage the set of clutch plates when the first hydraulic force is greater than a sum of the spring force and the determined drag force of the fluid seal.

16. The system of claim 15, wherein the controller is configured to regulate the operation of the clutch assembly to compensate for the determined drag force of the fluid seal acting counter to the displacement of the clutch piston via commanding the hydraulic circuit to increase the line pressure for increasing the first hydraulic force.

17. The system of claim 12, wherein the controller is configured to command the hydraulic circuit to apply the first hydraulic force to the clutch piston to urge the clutch piston away from and disengage the set of clutch plates when the first hydraulic force is smaller than a sum of the spring force and the determined drag force of the fluid seal.

18. The system of claim 17, wherein the controller is configured to regulate the operation of the clutch assembly to compensate for the determined drag force of the fluid seal acting counter to the displacement of the clutch piston via commanding the hydraulic circuit to reduce the line pressure for reducing the first hydraulic force.

19. The system of claim 11, wherein the controller is configured to regulate the operation of the clutch assembly to compensate for the determined drag force of the fluid seal acting counter to the displacement of the clutch piston via commanding the transmission to perform an upshift from one transmission speed-ratio to another speed-ratio to limit the rotational speed of the clutch assembly.

20. The system of claim 11, wherein:
the transmission is operatively connected to an internal combustion engine in a powertrain of a motor vehicle; and
the controller is configured to regulate the operation of the clutch assembly to compensate for the determined drag force of the fluid seal acting counter to the displacement of the clutch piston via limiting rotational speed of the engine.

* * * * *